(12) United States Patent
Sargeant et al.

(10) Patent No.: US 11,780,213 B2
(45) Date of Patent: Oct. 10, 2023

(54) LOW CARBON FOOTPRINT THERMOPLASTIC FILMS INCLUDING RECYCLED MATERIALS

(71) Applicant: FLEX FILMS (USA), INC., Elizabethtown, KY (US)

(72) Inventors: Steven Sargeant, Elizabethtown, KY (US); Krishna Kant Sharma, Elizabethtown, KY (US); Aarushi Srivastava, New Delhi (IN); Rajeev Parashar, New Delhi (IN); Bikaram Kholiya, Elizabethtown, KY (US)

(73) Assignee: Flex Films (USA) Inc., Elizabethtown, KY (US)

( * ) Notice: Subject to any disclaimer, the term of this patent is extended or adjusted under 35 U.S.C. 154(b) by 376 days.

(21) Appl. No.: 16/175,955

(22) Filed: Oct. 31, 2018

(65) Prior Publication Data

US 2019/0126599 A1 May 2, 2019

Related U.S. Application Data

(60) Provisional application No. 62/579,288, filed on Oct. 31, 2017.

(51) Int. Cl.
*B32B 27/08* (2006.01)
*B32B 27/36* (2006.01)
(Continued)

(52) U.S. Cl.
CPC .............. *B32B 27/08* (2013.01); *B32B 27/18* (2013.01); *B32B 27/20* (2013.01); *B32B 27/36* (2013.01); *B32B 7/00* (2013.01); *B32B 2250/03* (2013.01); *B32B 2250/244* (2013.01); *B32B 2250/40* (2013.01); *B32B 2255/10* (2013.01); *B32B 2255/205* (2013.01); *B32B 2255/26* (2013.01);
(Continued)

(58) Field of Classification Search
None
See application file for complete search history.

(56) References Cited

U.S. PATENT DOCUMENTS 4,571,363 A * 2/1986 Culbertson .............. G03C 1/93
428/332
5,703,134 A * 12/1997 Asrar ...................... C08J 11/26
528/304
(Continued)

FOREIGN PATENT DOCUMENTS

CA 2261716 A * 2/1998
JP 09-174780 A * 7/1997
(Continued)

OTHER PUBLICATIONS

Written Opinion of the International Searching Authority and International Search Report (forms PCT/ISA/237, PCT/ISA/210 and PCT/ISA/220), dated Jan. 24, 2019, for International Application No. PCT/US2018/058363.

*Primary Examiner* — Vivian Chen
(74) *Attorney, Agent, or Firm* — Dinsmore & Shohl LLP

(57) ABSTRACT

A thermoplastic film includes a core layer having a recycled polyethylene terephthalate (PET) based resin having an intrinsic viscosity of greater than about 0.7 and having a polydispersity index of greater than about 3.0. The thermoplastic film comprises about 90% to about 100% by weight of the recycled PET resin.

15 Claims, 3 Drawing Sheets

(51) Int. Cl.
    *B32B 27/18*     (2006.01)
    *B32B 27/20*     (2006.01)
    *B65D 65/40*     (2006.01)
    *B32B 7/00*     (2019.01)

(52) U.S. Cl.
    CPC ..... *B32B 2264/102* (2013.01); *B32B 2305/70* (2013.01); *B32B 2307/514* (2013.01); *B32B 2307/518* (2013.01); *B32B 2307/714* (2013.01); *B32B 2307/732* (2013.01); *B32B 2367/00* (2013.01); *B32B 2439/70* (2013.01); *B65D 65/40* (2013.01); *Y02P 20/143* (2015.11); *Y10T 428/31681* (2015.04); *Y10T 428/31786* (2015.04); *Y10T 428/31797* (2015.04)

(56) References Cited

U.S. PATENT DOCUMENTS

| | | | | |
|---|---|---|---|---|
| 2001/0008240 | A1* | 7/2001 | Herrin | B32B 27/08 220/359.2 |
| 2003/0068455 | A1* | 4/2003 | Oguro | C08L 67/02 428/35.7 |
| 2004/0086734 | A1* | 5/2004 | Janssens | B32B 27/36 428/482 |
| 2006/0008638 | A1* | 1/2006 | Kiehne | B32B 27/36 428/323 |
| 2006/0008641 | A1* | 1/2006 | Kiehne | C08J 5/18 428/328 |
| 2007/0031654 | A1* | 2/2007 | Posey | C09D 129/04 428/336 |
| 2009/0162675 | A1* | 6/2009 | Bourgeois | C08K 5/0008 428/454 |
| 2010/0006214 | A1* | 1/2010 | Fujimaki | B32B 7/12 156/244.12 |
| 2010/0136472 | A1* | 6/2010 | McDougall | G03G 9/0823 430/137.14 |
| 2010/0201015 | A1* | 8/2010 | Fujimaki | C08G 63/916 264/50 |
| 2011/0221097 | A1* | 9/2011 | Sasauchi | B29C 48/362 264/331.21 |
| 2012/0190800 | A1* | 7/2012 | Felice | C08J 11/26 560/85 |
| 2013/0109781 | A1* | 5/2013 | Lake | C08K 5/0033 523/124 |
| 2014/0221524 | A1* | 8/2014 | Lake | C08L 25/06 523/124 |
| 2014/0339124 | A1* | 11/2014 | Sasauchi | B29C 48/0017 206/524.3 |
| 2015/0259484 | A1* | 9/2015 | Nakano | C08J 5/18 521/48 |
| 2017/0152075 | A1 | 6/2017 | Moritz et al. | |
| 2017/0210889 | A1* | 7/2017 | LaPray | C08L 23/08 |
| 2017/0362418 | A1* | 12/2017 | LaPray | C08L 23/08 |

FOREIGN PATENT DOCUMENTS

| | | |
|---|---|---|
| JP | 2000-319493 A | * 11/2000 |
| JP | 2006-188676 A | * 7/2006 |
| JP | 2007-002240 A | * 1/2007 |
| JP | 2014-65282 A | 4/2014 |
| WO | WO 2008/021884 A2 | 2/2008 |
| WO | WO 2014/021396 A1 | 2/2014 |
| WO | WO 2016/112115 A1 | 7/2016 |
| WO | WO 2016/205682 A1 | 12/2016 |

* cited by examiner

LOW CARBON FOOTPRINT THERMOPLASTIC FILMS INCLUDING RECYCLED MATERIALS

BACKGROUND OF THE INVENTION

1. Field of the Invention

The presently-disclosed subject matter generally relates to low carbon foot print thermoplastic films including recycled materials. In particular, certain embodiments of the presently-disclosed subject matter relate to thermoplastic films including a recycled polyethylene terephthalate (PET) resin in a core layer of the films.

2. Description of the Background Art

The packaging of food, chemicals, medicines, industrial commodities and other such goods have for a significant period of time relied on rigid containers which are well known in the art. Suitable materials of construction for these rigid containers consist of glass, metals like tin-plate, aluminum, and steel. Furthermore, other rigid materials such as those constructed from ceramics are also found within the art. Rigid materials have excellent barrier and product protection attributes. Moreover, the decoration of rigid materials through labelling is a well-known methodology to improve the aesthetic attributes of rigid containers and has extended the utility for this packaging style for consumers for a considerable period of time.

Due to the long history of use, many rigid container materials have been established with cost effective recycle streams. For instance, in the case of aluminum beverage containers, it has been reported that about 70% of the aluminum within any given can comes from recycling of existing containers. Facile recycling of glass, steel, and other rigid container materials is also routinely performed and is known in the art. Indeed, in many instances these rigid materials are thought to exist in a closed loop whereby the materials are recycled back into the containers from which the materials were reclaimed.

Of course, recycling is not only a method to improve cost, but recycling is also a method to potentially reduce the environmental impact brought about by the production of new materials. For example, in the case of aluminum cans, it has been reported that only about 8% of the energy needed to make a new can from raw aluminum is needed when the can is recycled in a closed loop system. See the "Aluminum Can Advantage" infographic at aluminum.org.

Although rigid materials, such as aluminum, are often able to be readily processed and recycled, consumer preferences have more recently begun to move towards the packaging of food and other commodities in flexible containers. Materials, such as film based flexible packaging, provides for the construction of many packaging design styles with unique shelf-appeal valued in the modern marketplace. Additionally, barrier and robustness issues of flexible packaging materials have improved significantly to the point that freshness of products are acceptable to many end-users. To date, however, the recycling of flexible packaging materials has proven difficult due to the multiple layers used in a typical package construction, and thus, constructing a further flexible packaging material through the recycling of flexible packing materials has proven difficult to manage economically.

Low carbon footprint plastic film materials may be produced from several sources. It is known in the art to produce biaxially oriented plastic films from Polylactic Acid (PLA), Polyhydroxyalkonates (PHA), Polyethylenefuronate (PEF) and other biobased resin materials. Furthermore, the conversion of cellulose based materials into cellophane is a well-established method in the art to produce low carbon footprint thermoplastic materials. Other methodologies to produce low carbon foot print plastic film materials have relied on the use of biobased monomomers and comonomers used in the synthesis of the starting plastic resin. For instance, U.S. Pat. No. 9,561,676 describes the production of BOPET films for TTR applications from biosorced starting materials. No particular advantage is described to this process.

Although such methods may result in a low carbon footprint for plastic filmic materials, such processes suffer from extreme costs or technical viability issues thus limiting the commercial value of such approaches. Although, over time, advances in the basic cost structures for such materials are anticipated. From a practical point of view such approaches are of limited commercial utility.

U.S. Pat. No. 8,465,614 describes a process of recycling spent release polyester liners and producing new release liner stock from the spent materials. The patent further describes a process of increasing intrinsic viscosity of the spent release material via solid state polymerization. The patent includes no indication that BOPET films having specific polydispersity indexes are desired or required.

U.S. Pat. No. 8,845,840 describes a process of recycling polymer films by collecting spent liner stock, which has been removed from labels and reducing the stock into chips, and further describes the solid state polymerizing of those chips in order to increase intrinsic viscosity and extrude the liner stock chips into single or multilayer films. Nothing in this patent indicates that BOPET films having specific film polydispersity indexes are desired or required.

U.S. Pat. No. 7,229,581 describes the process of producing single-layer or multilayer thermoplastic films which use higher fractions of a crystallizable thermoplastic (PET, PBT, etc.), which have a relatively high viscosity, and which are extracted from the bottle industry as a waste product or byproduct. Nothing in this patent indicates that BOPET films having specific film polydispersity indexes are desired or required.

U.S. Pat. No. 7,700,015 discloses a process of producing biaxially oriented film, which consists of crystallizable thermoplastic as main component and about 500 ppm of pigment (based on the weight of thermoplastic) and 20% by weight recycled material, and whose molecular weight has been increased by condensation processes. Nothing in this patent indicates that BOPET films having specific film polydispersity indexes are desired or required.

SUMMARY OF THE INVENTION

One embodiment of this invention is directed to a thermoplastic film comprising a core layer comprising a recycled polyethylene terephthalate (PET) based resin having an intrinsic viscosity of greater than about 0.7 and having a polydispersity index of greater than about 3.0. The thermoplastic film comprises about 90% to about 100% by weight of the recycled PET based resin.

The core layer has a first side and a second side opposite the first side, and the thermoplastic film may further comprise a skin layer positioned on the first side, the second side, or both the first side and the second side of the core layer. The skin layer may include a virgin PET based resin. The skin layer may include silica. The virgin PET based resin may comprise a PET copolymer.

The thermoplastic film may further comprise an acrylic coating. The acrylic coating may have a thickness of 0.05 to 0.3 μm.

The film may be metallized.

The recycled PET resin may have a polydispersity index of greater than about 3.5. The recycled PET based resin may comprise a PET copolymer.

Another embodiment of this invention is directed to a thermoplastic film comprising a recycled polyethylene terephthalate (PET) resin; and an additive masterbatch for increasing the degradation rate of the thermoplastic film.

The recycled PET based resin may have an intrinsic viscosity of greater than about 0.7. The recycled PET based resin may have a polydispersity index of greater than about 3.0. The recycled PET based resin may form a core layer of the film. The thermoplastic film may further comprise one or more skin layers positioned on the core layer, the one or more skin layers comprising virgin PET based resins. The recycled PET resin may have a polydispersity index of greater than about 3.5. The thermoplastic film may comprise about 90% to about 100% by weight of the recycled PET based resin. The skin layer may include silica. The thermoplastic film may further comprise an acrylic coating. The film may be metallized.

Further scope of applicability of the disclosure will become apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to one of ordinary skill in the art from this detailed description.

BRIEF DESCRIPTION OF THE DRAWINGS

The disclosure will become more fully understood from the detailed description given below and the accompanying drawings that are given by way of illustration only and are thus not limitative of the disclosure.

DESCRIPTION OF EXEMPLARY EMBODIMENTS

Figure 1:
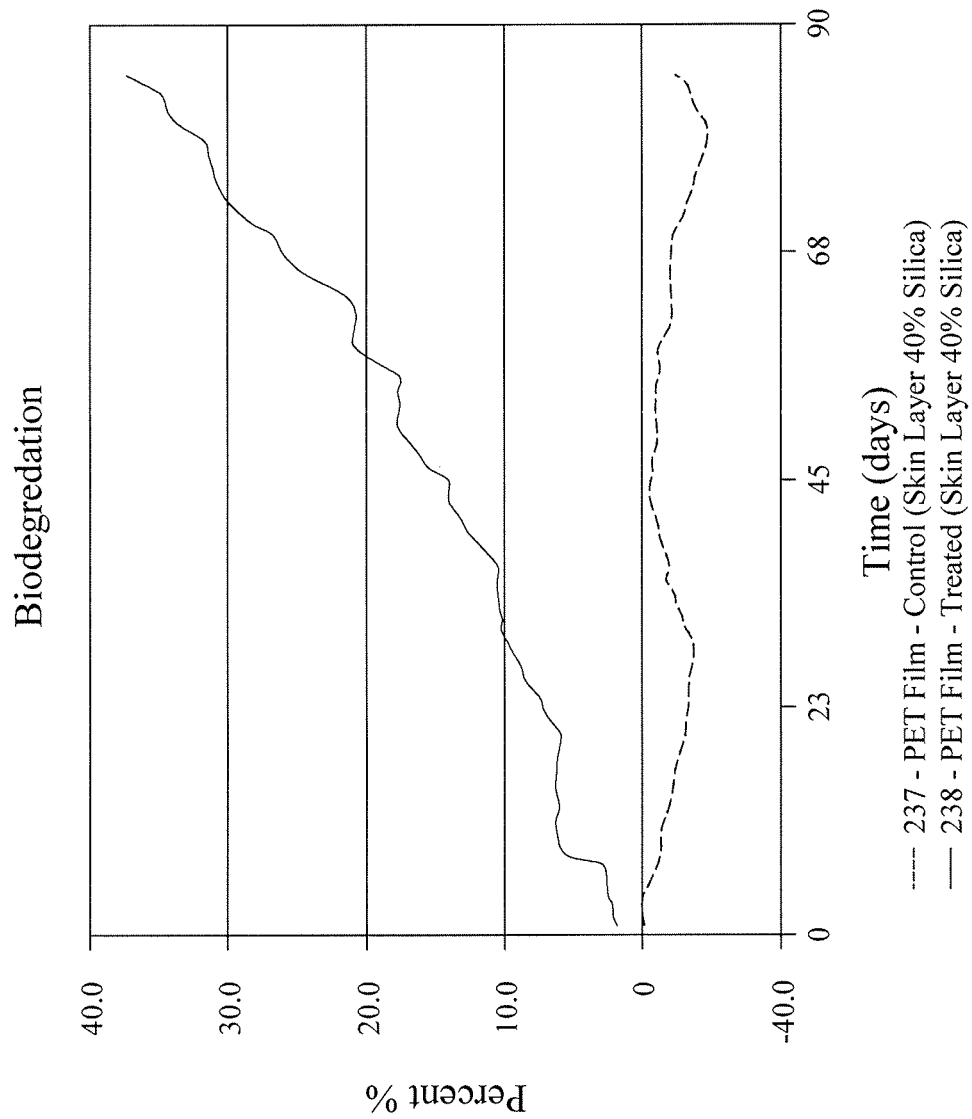
FIG. 1 is a graph showing percent degradation over time for a control and treated PET film. This figure shows the generation of biomethane as a function of time after inoculation of the film with common bacteria. In one case, the control, the generation of biomethane is practically nothing. In the example case, the generation of biomethane is almost 45% after 90 days.

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

While the terms used herein are believed to be well understood by those of ordinary skill in the art, certain definitions are set forth to facilitate explanation of the presently-disclosed subject matter.

Unless defined otherwise, all technical and scientific terms used herein have the same meaning as is commonly understood by one of skill in the art to which the invention(s) belong.

All patents, patent applications, published applications and publications, databases, websites and other published materials referred to throughout the entire disclosure herein, unless noted otherwise, are incorporated by reference in their entirety.

Where reference is made to a URL or other such identifier or address, it understood that such identifiers can change and particular information on the internet can come and go, but equivalent information can be found by searching the internet. Reference thereto evidences the availability and public dissemination of such information.

Although any methods, devices, and materials similar or equivalent to those described herein can be used in the practice or testing of the presently-disclosed subject matter, representative methods, devices, and materials are described herein.

The present application can "comprise" (open ended) or "consist essentially of" the components of the present invention as well as other ingredients or elements described herein. As used herein, "comprising" is open ended and means the elements recited, or their equivalent in structure or function, plus any other element or elements which are not recited. The terms "having" and "including" are also to be construed as open ended unless the context suggests otherwise.

Following long-standing patent law convention, the terms "a," "an," and "the" refer to "one or more" when used in this application, including the claims. Thus, for example, reference to "a layer" includes a plurality of such layers, and so forth.

Unless otherwise indicated, all numbers expressing quantities of ingredients, properties such as reaction conditions, and so forth used in the specification and claims are to be understood as being modified in all instances by the term "about." Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, "optional" or "optionally" means that the subsequently described event or circumstance does or does not occur and that the description includes instances where said event or circumstance occurs and instances where it does not. For example, an optionally variant portion means that the portion is variant or non-variant.

The presently-disclosed subject matter is based, at least in part, on the discovery of novel thermoplastic films and associated methodologies to improve the carbon footprint of thermoplastic films. In particular, a novel thermoplastic film and production process has been discovered that reduces the carbon footprint typically associated with the production of polyester films used in flexible packaging and labelling markets by making use of a high content of recycled resin from post-consumer sources. For example, in some embodiments of the presently-disclosed subject matter, the use of such high content of post-consumer resins (PCR) in the film making process provides a decrease in polydispersity of the polyester resin blend as measured with gel permeation chromatography (GPC). As would be recognized by those skilled in the art, the term "polydispersity index" refers to the polydispersity of a given starting resin versus that measure in a resulting film. Typically, in the manufacturing of thermoplastic films, an increase in polydispersity is measured as the manufacturing proceeds from starting resin to a film. As described herein, however, it has been advantageously discovered a net decrease in polydispersity in films making use of highly-recycled materials.

In some embodiments of the presently-disclosed subject matter, a thermoplastic film is provided that includes a recycled polyethylene terephthalate (PET) resin. In some cases, the thermoplastic film may contain up to about 2.0% IPA comonomer. The thermoplastic film preferably contains 1.0% or less IPA comonomer and more preferably contains 0% IPA comonomer.

The term "recycled PET resin" is used herein to refer to a PET resin obtained using pre-existing PET-based flexible packaging material. For instance, in some embodiments, a recycled PET resin can be produced from recycling previously-produced PET bottles including, for example, PET bottles including about 2.0 mol % isophthalic acid. In some embodiments, the recycled PET resin has an intrinsic viscosity (IV) of greater than about 0.7, as measured by, for example, ASTM D4603. The recycled PET resin may have an intrinsic viscosity of greater than about 0.75 or greater than about 0.8.

In some embodiments, the recycled PET resin has a polydispersity index of greater than about 3.0, greater than about 3.5, or greater than about 4.0, as measured by, for example, gel permeation chromatography. In some embodiments, the recycled PET is preferentially generated from post-consumer recycled beverage containers. Such container materials are typically constructed with modified PET backbone materials utilizing up to about 1.8% by mol content of isophthalic acid comonomer in replacement of terephthalic acid.

Figure 3:
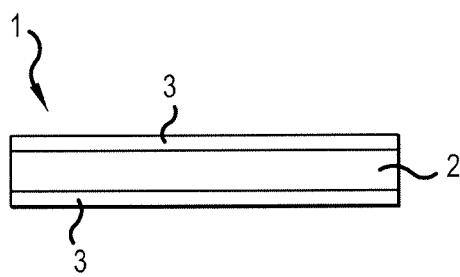
FIG. 3 is a schematic diagram of a thermoplastic film having an "A/B/A" configuration, according to an embodiment of the disclosure.
Figure 4:
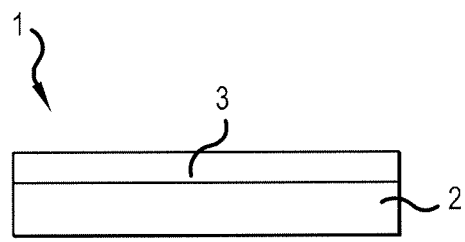
FIG. 4 is a schematic diagram of a thermoplastic film having an "A/B" configuration, according to an embodiment of the disclosure.

The recycled PET resins included in the thermoplastic films are generally included in the thermoplastics films such that the recycled PET resins comprise about 90% to about 100% by weight of the thermoplastic films. In some embodiments, as illustrated in FIGS. 3-4, the recycled PET resins form a core 2 of the thermoplastic film 1, where the core 2 includes a first side and a second side opposite the first side. In this regard, in some embodiments, an exemplary thermoplastic film 1 can further include a skin layer 3 positioned on the first side, the second side, or both the first side and the second side of the core layer 2.

The skin layers included in an exemplary thermoplastic film of the presently-disclosed subject matter are typically comprised of virgin PET or, in other words, PET that has not previously been utilized to produce a PET material (e.g., a flexible PET packaging) and is thus PET that is not obtained from recycled sources. In some embodiments, the virgin PET included in the skin layer can include a PET homopolymer and/or a PET layer including one or more additives, such as silica. PET homopolymers, as used herein, include a PET layer consisting of only polyethylene terephthalate. Alternatively, the one or more additives may be included in the PET layer by combining a PET resin with an additive containing master resin. The additive containing master resin may include any suitable concentration of additive and/or be combined with the PET resin at any suitable concentration. For example, in one embodiment, the PET layer including one or more additives comprises a combination of PET resin and silica containing PET resin at a ratio of between 50:50 and 99:1, between 50:50 and 95:5, 50:50 and 90:10, 60:40 and 90:10, 70:30 and 90:10, 75:25 and 85:15, about 80:20, or any suitable combination, sub-combination, range, or sub-range thereof.

Additionally, or alternatively, in some embodiments, the recycled PET resin in the core layer and the PET included in the skin layer can include a PET copolymer, where the particular PET layer includes PET (either recycled or virgin) and one or more additional co-monomers. Additional co-monomers that can be used in this regard include diethylene glycol, propylene glycol, neopentyl glycol and polyalkylene glycols, 1,4-butane diol, 1,3-propane diol, and dicarboxylic acids such as adipic acid, sebacic acid, malonic acid, succinic acid, isophthalic acid, and 2,6-napthalenedicarboxylic acid. In certain embodiments, the PET copolymer includes a polyethylene terephthalate copolyester, where the polyethylene terephthalate layer includes one or more diacids, diols, or combinations thereof.

Regardless of whether the core and skin layers include PET homopolymers, PET copolymers, or PET layers including one or more additives, the core layers and skin layer included in the thermoplastic films of the presently-disclosed subject matter are generally prepared by processes known to those of ordinary skill in the art including the use of conventional sequential biaxial orientation machines having a single screw mainline extrusion train and a twin screw sub-extrusion process. In this regard, in some embodiments, pellets of recycled PET material for inclusion in a core layer material and having a desired intrinsic viscosity can be fed into the main extrusion line, while standard pellets or a blend of pellets including an outer, skin layer material can be fed in to the sub-extrusion process, such that the materials can be melted separately and then laminated together in a feed-block to produce a desired molten structure (e.g., an A/B/A molten structure) in an extrusion die. For example, in one embodiment, recycled PET resin pellets are fed into the main extrusion line, while a blend of virgin PET pellets and silica-filled PET pellets is fed into the sub-extrusion process.

In some embodiments, the materials or layers emerging from the extrusion die are then quenched on a chilled casting drum to produce a thick, amorphous film structure. The core and skin layers are then preferably stretched about 2 to about 5 times in the machine, or longitudinal, direction and about 2 to about 5 times in the transverse direction, or cross, direction, followed by heat crystallization. In some embodiments, after stretching the extruded layers in the longitudinal and transverse direction and crystallization, one or more of the layers is obtained having a tensile strength of at least about 25000 psi in both the transverse and the longitudinal direction of the film, and having dimensions that are about 15 times those originally found in the layers in both the longitudinal and transverse direction.

The thickness of the resulting films can depend on a variety of factors, including, but not limited to, the number of layers in the film, the thickness of the individual layers, the stretching ratio, and the like. In some embodiments, by stretching the resulting film in the above-described manner, the film has a total thickness of about 100 μm or less, a total thickness of about 70 μm or less, a total thickness of about 50 μm or less, a total thickness of about 30 μm or less, or a total thickness of about 10 μm or less. In some embodiments, the film has a total thickness of about 5 μm to about 50 μm, including about 5 μm, 10 μm, 15 μm, 20 μm, 25 μm, 30 μm, 35 μm, 40 μm, 45 μm, and 50 μm. In some embodiments, the film has a total thickness of about 6 μm to about 12 μm, including about 6 μm, about 7 μm, about 8 μm, about 9 μm, about 10 μm, about 11 μm, and about 12 μm. In some embodiments, the as produced film has a thickness in the range of about 12 μm to about 50 μm.

In some embodiments, after extruding and/or stretching the thermoplastic films described herein, one or more additional materials and/or layers can also be applied to the thermoplastic films of the presently-disclosed subject matter. For example, in some embodiments, after extruding and/or stretching, a metal barrier layer is applied over at least one side of the film. The term "metal barrier layer" is used herein to refer to both traditional metallized layers, such as aluminum layers, as well as more ceramic-like layers, such as layers comprised of silicon oxide and/or aluminum oxide. Such metal barrier layers are applied using a number of deposition methods including, but not limited to, vacuum deposition, physical vapor deposition, or chemical vapor deposition. For example, in one embodiment, the metal barrier layer is an aluminum oxide layer that is applied by vacuum vapor deposition in a vacuum in situ, where aluminum is heated under low pressure conditions (e.g., less than about $1.0 \times 10^{-3}$ mbar) in the presence of oxygen gas to allow the aluminum to form a vapor at a lower temperature and then be applied to the film as a clear barrier layer of aluminum oxide without causing thermal damage to the other layers during its application. In another embodiment, the metal barrier layer can be in the form of an aluminum layer that can be formed by heating an aluminum wire fed to the surface of an electrically heated plate or by heating an ingot of aluminum within a crucible, and then condensing the resulting aluminum vapor on at least one side of the film. In this regard, in such embodiments, the films are typically vacuum metallized to an optical density of at least about 2.6 to provide a film capable of providing a high gas barrier.

Figure 5:
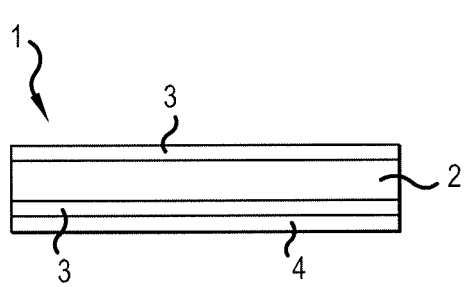
FIG. 5 is a schematic diagram of a thermoplastic film having an "A/B/A" configuration with an inline surface coating, according to an embodiment of the disclosure.
Figure 6:
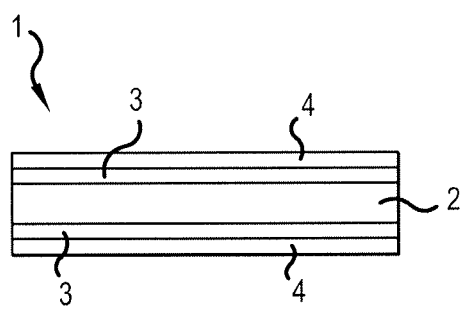
FIG. 6 is a schematic diagram of a thermoplastic film having an "A/B/A" configuration with a 2-side inline surface coating, according to an embodiment of the disclosure.

Additionally or alternatively, in some embodiments, as illustrated in FIGS. 5-6, the thermoplastic films 1 described herein include one or more coatings 4 positioned over a core layer 2 and/or a skin layer 3. Suitable coatings 4 applied over at least one side of the film 1 include, but are not limited to, an acrylic coating, a polyurethane coating, a polysulphonester coating, and a quaternary ammonium-based coating. Such coatings can be applied to the film described herein by a number of methods, including application of the coating material in a dispersion or solution of water, and by an application method such as gravure coating, Meyer rod coating, slot die, knife over roll, or any variation of roll coating. In some embodiments, the coating material is applied by inline coating, whereby the coating material is applied to the film as it is being produced.

In some embodiments, the coating applied to the film is in form of an acrylic primer, which, in certain embodiments, can then form a cross-linked acrylic primer layer on the film. In some embodiments, the acrylic primer is highly cross-linked and capable of providing a low coefficient of friction (COF) to metal to increase the contact of film to metal and to facilitate the vacuum metallizing process described herein. Descriptions of particularly suitable coating properties are found in U.S. Pat. No. 9,580,798, which is incorporated herein by reference. Regardless of the particular type of metal barrier layer that is applied, in some embodiments, including the acrylic primer layer having a low COF to metal permits the film to continually be in sufficient contact with a chill roll to ensure that few thermal defects are included on the film as the metal layer is produced or to ensure that a minimum number of defects are found in the film. Without wishing to be bound by any particular theory or mechanism, in some embodiments, it is contemplated that inclusion of an acrylic coating can affect the overall recycling of the PET films described herein. As such, in certain embodiments, and as acrylics are generally not miscible in PET films, any acrylic coating included in a film of the presently-disclosed subject matter has a thickness of no greater than about 0.05 μm to about 0.30 μm, preferably about 0.05 μm to about 0.10 μm, as acrylic layers having thicknesses greater than such values may result in gel issues if material is recycled back into PET films.

In one embodiment, the thickness of the acrylic primer layer applied to one or both sides of the film is about 0.3 μm, about 0.25 μm, about 0.2 μm, about 0.15 μm, about 0.10 μm, or about 0.05 μm.

In another embodiment, the dynamic COF of the acrylic layer of the film to the metal is about 0.15 μD to about 0.45 μD when heated to 150° C. In some embodiments, the dynamic COF of the acrylic layer of the film to the metal is about 0.15 μD, about 0.20 μD, about 0.25 μD, about 0.30 μD, about 0.35 μD, about 0.40 μD, or about 0.45 μD. In a further embodiment, the dynamic COF of the acrylic layer of the film to the metal is less than about 0.45 μD when heated to 150° C. In certain embodiments, the COF of the acrylic layer of the film to the metal is less than about 0.20 μD when heated to 150° C.

In some embodiments, to produce an acrylic primer layer having such properties, the acrylic primer layer can be comprised of an acrylic resin that adheres well to a polyethylene terephthalate layer. Such acrylic resins can be selected from resins having a monomer component such as, for example, an alkyl acrylate, an alkyl methacrylate, (examples of such alkyl groups include a methyl group, an ethyl group, an n-propyl group, an isopropyl group, an n-butyl group, an isobutyl group, a t-butyl group, a 2-ethylhexyl group, a lauryl group, a stearyl group, a cyclohexyl group, a phenyl group, a benzyl group, a phenylethyl group and the like), a monomer having a hydroxyl group such as 2-hydroxyethyl acrylate, 2-hydroxyethyl methacrylate, 2-hydroxypropyl acrylate, 2-hydroxypropyl methacrylate or the like, a monomer having an amide group such as acrylamide, methacrylamide, N-methyl acrylamide, N-methyl methacrylamide, N-methylol acrylamide, N-methylol methacrylamide, N,N-dimethylol acrylamide, N-methoxymethyl acrylamide, N-methoxymethylmethacrylamide, N-phenyl acrylamide or the like, a monomer having an amino group such as N,N-diethylamino ethyl acrylate, N,N-diethylamino ethyl methacrylate or the like, a monomer having an epoxy group such as glycidyl acrylate, glycidyl methacrylate or the like, a monomer having a carboxylic acid or a salt thereof such as acrylic acid, methacrylic acid or a salt thereof (an alkali metal salt, an alkali earth metal salt, an ammonium salt or the like) and the like whereupon one or more types of such monomer components are copolymerized.

In some embodiments, the acrylic primer is comprised of a copolymer of methyl methacrylate that further includes methacrylic acid and methacrylonitrile. In some embodiments, the acrylic primer is comprised of a co-polymer of methylmethacrylate, butylacrylate, methacrylic acid, methyl acrylate, acrylic acid, and hydroxyethylmethacrylate, alone or in combination with other monomers, as such a combination of monomers has been observed to produce an acrylic primer layer having sufficient hardness and COF values as well as a sufficient ability to adhere to down-stream sealants including, but not limited to, polyethylene, ethylene vinyl acetate, ethylene methyl acrylate, and copolymers and terpolymers thereof.

In addition to the acrylic components of the acrylic primer layer, one or more cross-linking agents are typically also included in the acrylic primer layer to harden the acrylic primer layer, to reinforce the bonding between the various layers of the high-barrier film, and to also provide a highly cross-linked layer capable of providing increased thermal resistance when the film is subsequently vacuum-metallized. Exemplary cross-linking agents that can be used with the acrylic components include, but are not limited to, melamine-based cross-linkers, epoxy-based cross-linkers, aziridine-based cross-linkers, epoxyamide compounds, titanate-based coupling agents (e.g., titanium chelate), oxazoline-based cross-linkers, isocyanate-based cross-linkers, methylolurea or alkylolurea-based cross-linkers, aldehyde-based cross-linkers, and acrylamide-based cross-linkers. In some embodiments, the cross-linking agent is selected from melamine, epoxy-based cross-linkers, and aldehyde-based cross-linkers.

In some embodiments, the cross-linking agents are included in the acrylic primer layer to produce a cross-linked acrylic primer layer having a cross-linking density of about 10%, about 15%, about 20%, about 25%, about 30%, or about 40%. In some embodiments, the cross-linking agents are included in the acrylic primer layer to produce a cross-linked acrylic primer layer having a cross-linking density of greater than about 10%.

In some embodiments, the thermoplastic film may further comprise pigments. Nanosized inorganic pigments may be utilized to impart color, opacity or other aesthetic attributes as may be desired by the consumer. Furthermore, organic pigments may be utilized for technical effect such as to impart lightfastness, hydrolysis resistance, improve impact resistance and alike. Preferred pigments may be admixed into the PCR containing layer or co-extruded into skin-layers. It is well known to those skilled in the art which approach or material and film structure is to be utilized based on fitness-for use criteria.

Once the acrylic primer layer has been applied to the film, an electrical treatment, such as a plasma or corona treatment, can then be optionally used to change the surface energy on one or more sides of the film, thereby allowing for increased bond strength between the film and the metal barrier layer upon its deposition. In some embodiments, the layers can be corona treated to a dyne value of about 50 to about 60 dynes (e.g., 56 dynes), as such dyne values have been observed to allow sufficient bonding between the metal barrier layer and the PET film. Typically, the bonding strength or, in other words, the strength of the metal adhesion to the PET film, is greater than 150 g/in and, preferably, greater than 250 g/in as measured by first laminating a strip of an ionomer resin (e.g., Surly, DuPont de Nemours and Company, Wilmington, Del.) to the deposited metal layer on the film and then removing the metal by pulling on the resulting film-ionomer laminate in a tensile tester according to Association of International Metallizers, Coaters, and Laminators (AIMCAL) guidelines for measuring metal adhesion to films.

In other embodiments the primer layer is constructed to have additional barrier properties to further enhance the barrier of the constructed films. Such barrier layers are preferably applied inline during the manufacture of the PET films. However, applying the barrier coatings off-line is also suitable. From a cost perspective, inline application of the barrier coatings can be preferred. Examples of coating suitable for inline coating include polyvinylalcohol, ethylenevinylalcohol, copolymers of polyvinylalcohol and ethylenevinylalcohol and alike materials. When applied, these barrier coatings may provide even further enhanced properties. In some embodiments, and similar to the acrylic coatings described herein above, the thickness of such barrier coatings is in the range of 0.05 μm to about 0.10 μm as barrier coatings having too great a thickness may also affect the subsequent recycling of the films.

The presently-disclosed subject matter is further illustrated by the following specific but non-limiting examples.

EXAMPLES

Example 1

Production of Thermoplastic Film Including Recycled Materials

A thermoplastic biaxially oriented polyethylene terephthalate (BOPET) film was produced with a low carbon footprint. The film was constructed from post-consumer produced polyethylene terephthalate (PET) pellets having an intrinsic viscosity (IV) of about 0.70 (see, e.g., ASTM D4603 for a description of intrinsic viscosity measurement). The PET resin included in the PET pellets was produced from recycling consumer-returned PET bottles. The bottles typically included about 1.5-2.0 mol % of isophthalic acid (IPA) in the polyester matrix and could be obtained from a number of sources, including collection from curb side recycling sources or bottle return programs. Additionally, the materials were collected and processed in a manner known to maintain food grade status for the intended use, and thus, contamination from alternative materials or non-FDA certified PET sources was not permitted.

The BOPET film was constructed to include both a skin layer and a core layer. The skin layer (A) was constructed using 53% virgin PET and 47% silica-containing PET at a loading of 4000 PPM. The average particle size of the silica was about 2.5 μm. The core layer (B) was constructed of 100% post-consumer resins (PCR) in the form of the above-described PET pellets produced from recycling of the bottle-based containers. Many variations of this low carbon foot print structure are possible. Variation of silica size and content, use of other inorganic particles for anti-blocking effect, variation of core and skin layer thickness and alike are readily conceivable to those skilled in the art.

To assemble the BOPET film, the (A) and (B) layers were co-extruded through a multilayer feedblock to produce a film with having an A/B/A structure. In the construction of the BOPET film, no materials recycled from internal sources were utilized. Only externally produced PCR materials were used. After production, the casted film was then quenched on a chilled roll polished to a mirror finish and subsequently stretched in the machine direction (machine direction orientation or MDO) to a stretch ratio of about 3.5. By not including PCR in the exterior layers, the film was not sticky at the stretching temperatures and did not adhere to the heated roll assembly during the MDO stretching or when the film was applied to the nipping rolls.

The uniaxially oriented film was then sent into a tentering oven. The film was stretched in a transverse or cross machine direction (TDO) by about a factor of 4.2× and then heated to about 210° C. to heat-set the film. Again, without containing PCR resin in the exterior film surfaces, the film was not sticky and did not adhere to the tentering clips used to transport the film in the stretching process through the TDO oven.

Subsequent to production, the polydispersity of the as produced film was analyzed using gel permeation chromatography. Briefly, for GPC sample preparation, the samples were provided as off-white pellets and clear films. The samples were cut with a clean blade and allowed to dissolve in hexafluoroisopropanol (HFIP) with 0.01 M sodium trifluoroacetic acid at 45° C. for 4 hours. The polymeric portion of the pellet sample was observed to dissolve, with insoluble filler remaining. Before injection, the filler was allowed to settle on the bottom of the glass scintillation vial, while the sample was removed from the top of the vial using a glass pipette.

For analysis, the samples were monitored using an RI 2012 refractive index detector (Buck Scientific, Norwalk, Conn.). Data acquisition and handling was performed using Jordi GPC software (Jordi Labs, Mansfield, Mass.). Data was obtained using the conditions in Table 1 below.

TABLE 1

| | Analysis Conditions. |
|---|---|
| Solvent | Hexaflouraisopropanol (HFIP)/0.01M NaTFA |
| Flow Rate | 1.0 mL/min |
| Injection Volume | 100 µL fir sample, 50 µL for standards |
| Column Temperature | 40° C. |
| Concentration | 1.25 mg/mL for sample, 0.5 mg/mL for standards |
| Column | Jordi Resolve xStream Mixed Bed 5µ, 7.8 × 300 mm |
| Run Time | 20 minutes |
| Sample Prep Conditions | 4 hours at 45° C. with gentle agitation |
| Standards | Polymethyl methacrylate (molecular weight as follows: 1568K, 617.5K, 320K, 137.8K, 66.65K, 26.08K, 10.28K, 4.47K, 1.95K, 960 Da |

Upon analysis of the GPC results, it was found that the PCR pellets used in the core layer were preferentially found to have an Mw/Mn of approximately 4. Extruding pellets of that polydispersity provided excellent film making properties and could be run with relatively minor process condition issues. No abnormal film breaks or process troubles were noted.

Example 2

Evaluation of Addition of Additive Master Batch

During development of the above-described PET films made from PCR, an additive master batch that assists in the natural breakdown of thermoplastic materials via bacteriological sources was also added to certain embodiments. Such additives could be found from commercial sources, such as the additive master batch produced by Enso Plastics and sold as Enso Restore™ (Enso Plastics, Mesa, Ariz.), or may be added in to the polyester resin stream via a secondary feeder. In one exemplary process, 1.1% of Enso Restore™ as an additive material was let-down into virgin PET and a 12 µm film was casted and oriented according to established methods. After inoculation, the additive containing film was found to be about 40% degraded into methane though bacteriological action when compared to the control film as shown in FIG. 1.

Example 3

Evaluation of PET Liner Materials as Source of Recycled Materials

Figure 2:
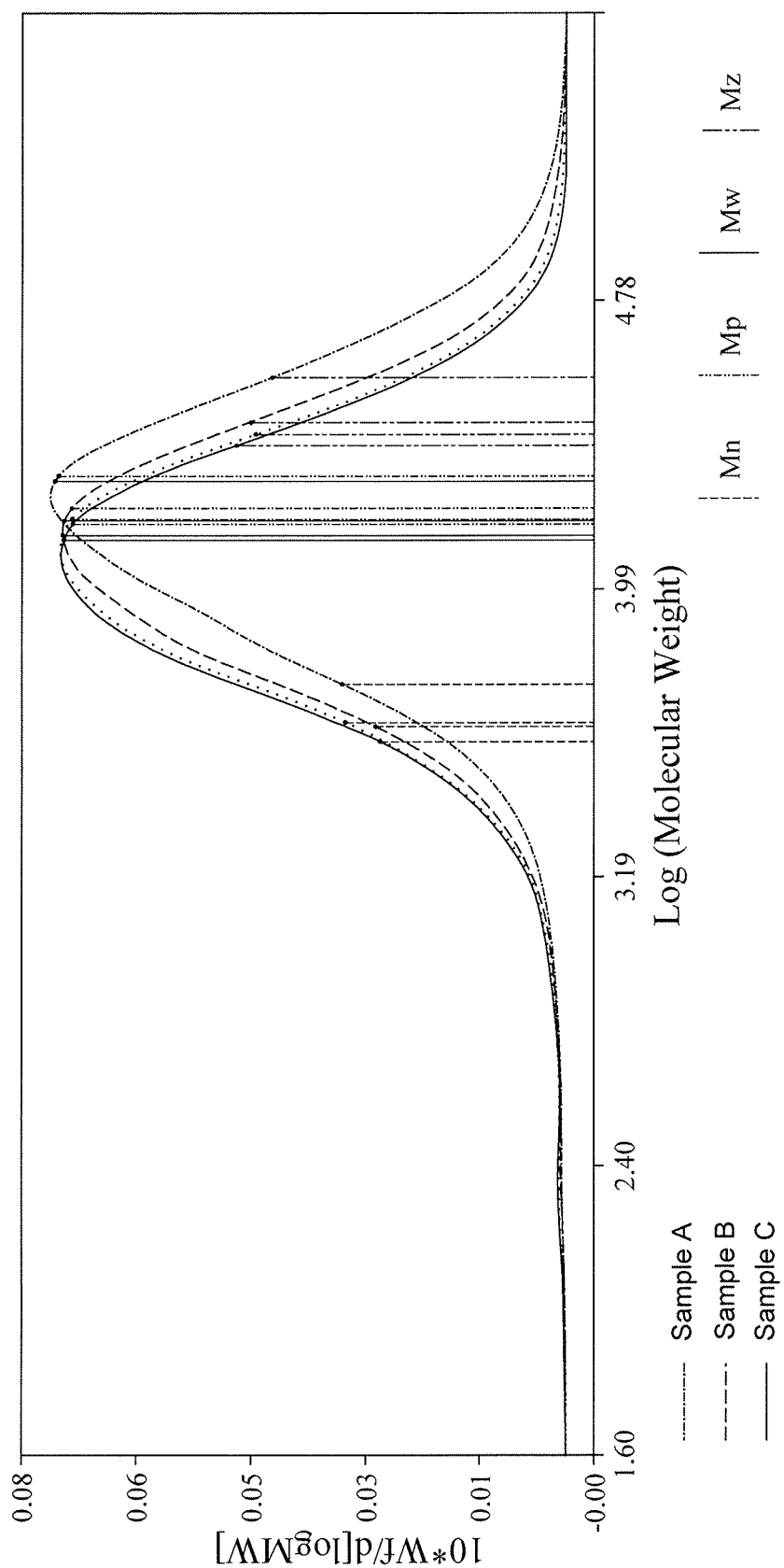
FIG. 2 is a graph showing the molecular weight distribution of the various test materials as per the specification for GPC testing of molecular weight and molecular weight distribution.

To evaluate the use of other recycled PET materials in the production of BOPET films, recycled PET liners were obtained and included in an exemplary film, and were then evaluated against various PET samples as shown in Table 2 and 3 and FIG. 2 below. The recycled liners were captured from multiple sources, and the source material was first cleaned to remove residual materials, such as adhesives, which were not suitable for recycling.

TABLE 2

Life Cycle Analysis and Evaluation of PCR Liner Materials.

| Film Resin Source | 1# of film produced $CO_2$ | 1# of film produced Kw | Source Data |
|---|---|---|---|
| Virgin PET | 2.8 | 10.2 | A |
| 50% PCR container resin, 50% Virgin PET | 1.8 | 6.4 | A |
| 90% PCR Container Resin, 10% Virgin PET | 1.0 | 3.3 | A |
| 70% Virgin PET, 30% Internal Recycle | 2.5 | 8.9 | B |
| 50% Recycled PET Liner, 50% Virgin Resin | 2.1 | 6.9 | B |

(A) Source data originally from EPA Database, "Life Cycle Inventory of Single Serve Soft Drink Containers" by Franklin Associates (August 2009), and Ashby, Michael F., Materials and the Environment: Eco-informed Material Choice, Elsevier Science, 2013.

(B) Internal Calculations

TABLE 3

Average Molecular Weight of Recycled Materials.

| Sample ID | Run | $M_n$ | Avg. | $M_w$ | Avg. | $M_z$ | Avg. | $M_w/M_n$ | Avg. |
|---|---|---|---|---|---|---|---|---|---|
| Sample A - PCR Pellets | 1 | 5,280 | 4,842 | 19,164 | 19,138 | 36,937 | 37,438 | 3.63 | 3.98 |
| | 2 | 4,405 | | 19,112 | | 37,398 | | 4.34 | |
| Sample B - 3-layer PET Film Prepared with 100% PCR Pellet in Core | 1 | 4,043 | 4,155 | 14,900 | 14,981 | 27,767 | 27,946 | 3.69 | 3.61 |
| | 2 | 4,267 | | 15,062 | | 28,124 | | 3.53 | |
| Sample C - 3-Layer PET Film Prepared with about 30% Internal Recycled Pellets in Core | 1 | 3,655 | 3,542 | 13,278 | 13,229 | 24,080 | 24,195 | 3.63 | 3.74 |
| | 2 | 3,428 | | 13,179 | | 24,311 | | 3.84 | |
| Sample D - 3-Layer PET Film Prepared with about 0% Internal Recycled Pellets in Core | 1 | 4,134 | 4,186 | 13,644 | 13,664 | 25,749 | 25,146 | 3.30 | 3.26 |
| | 2 | 4,239 | | 13,684 | | 24,544 | | 3.23 | |

In the foregoing experiments, the number average molecular weight ($M_n$) was calculated as the statistical average molecular weight of all polymer chains in the sample, and was defined by the equation: $M_n = \Sigma N_i M_i / \Sigma N_i$, where $M_i$ is the molecular weight of a chain and $N_i$ is the number of chains of that molecular weight. $M_n$ could be predicted by polymerization mechanisms and was measured by methods that determine the number of molecules in a sample of a given weight; for example, colligative methods such as end-group assay. If $M_n$ was quoted for a molecular weight distribution, there would be equal numbers of molecules on either side of $M_n$ in the distribution.

Additionally, the weight average molecular weight ($M_w$) was defined by the equation: $Mw = \Sigma N_i M_i^2 / \Sigma N_i M_i$. In this regard, compared to $M_n$, Mw took into account the molecular weight of a chain in determining contributions to the molecular weight average. The more massive the chain, the more the chain contributed to the $M_w$. $W_w$ was determined by methods that were sensitive to the molecular size rather than just their number, such as light scattering techniques. If $M_w$ was quoted for a molecular weight distribution, there would be an equal weight of molecules on either side of $M_w$ in the distribution.

In the analysis, higher average molecular weights ($M_z$, $M_{z+1}$) were, in general, a series of average molecular weights defined by the equation: $M = \Sigma N_i M_{n+1} / \Sigma N_i M_i^n$, where n equal to 1 gives M equal to $M_w$, where n equal to 2 gives M equal to $M_z$, and where n equal to 3 gives M equal to $M_{z+1}$.

Finally, the Polydispersity index, a measurement of the broadness of a molecular weight distribution of a polymer, was defined by the equation: Polydispersity Index $= M_w/M_n$.

Comparative Example 4

BOPET Films Including Recycled PET from Internal Sources

To evaluate the inclusion of recycled PET materials obtained from internal sources, a BOPET film was prepared with virgin resin produced from polycondensation and solid stating reactions well known in the art. The IV of that virgin resin was found to be 0.62, and the molecular weight distribution of the virgin resin, as measured by GPC, was found to be 3.26. After extrusion and blending with internal recycled film (i.e., process waste collected from the edges of large rolls of PET film, reprocessed rolls with quality defects, and or customer rejected rolls of PET film that has been reground into a fluff, repelletized and is then typically re-introduced back into the production process at the drying phase) at about 30% in the core layer the Mw/Mn increased significantly to 3.74. Additionally, it was observed that the BOPET produced with the PET from the internal recycle resulted in poor film making and increased color in the film. Web breaks associated with polymer degradation also increased with the addition of the internal recycle and became more apparent with increasing amount of internal recycled materials.

Low carbon footprint plastic film materials are commercially of interest in many areas. For instance, in the production of low carbon footprint flexible packaging materials, production of labels and signage and so forth, the combination of one or more low carbon footprint plastic layers with other materials can reduce the carbon footprint of the overall construction. Inclusion of biodegradable additives in the low carbon footprint PCR based materials may further increase the commercial value of such materials.

All publications, patents, and patent applications mentioned in this specification are herein incorporated by reference to the same extent as if each individual publication, patent, or patent application was specifically and individually indicated to be incorporated by reference.

It will be understood that various details of the presently disclosed subject matter can be changed without departing from the scope of the subject matter disclosed herein. Furthermore, the foregoing description is for the purpose of illustration only, and not for the purpose of limitation.

The invention claimed is:
1. A thermoplastic film, comprising:
a core layer comprising a recycled polyethylene terephthalate based resin having an intrinsic viscosity of greater than or equal to 0.7 and having a polydispersity index of greater than or equal to 3.5;
wherein the thermoplastic film comprises a biaxially-oriented PET film having about 90% to about 100% by weight of the recycled PET based resin.
2. The thermoplastic film of claim 1, wherein the core layer has a first side and a second side opposite the first side, and wherein the thermoplastic film further comprises a skin layer positioned on the first side, the second side, or both the first side and the second side of the core layer.

3. The thermoplastic film of claim 2, wherein the skin layer includes a virgin PET based resin.

4. The thermoplastic film of claim 3, wherein the skin layer includes silica.

5. The thermoplastic film of claim 3, wherein the virgin PET based resin comprises a PET copolymer.

6. The thermoplastic film of claim 1, further comprising an acrylic coating.

7. The thermoplastic film of claim 6, wherein the acrylic coating has a thickness of 0.05 to 0.3 μm.

8. The thermoplastic film of claim 1, wherein the film is metallized.

9. The thermoplastic film of claim 1, wherein the recycled PET based resin comprises a PET copolymer.

10. A biaxially-oriented polyethylene terephthalate thermoplastic film, comprising:
    a recycled polyethylene terephthalate (PET) resin, wherein the recycled PET based resin has an intrinsic viscosity of greater than or equal to 0.7 and a polydispersity index of greater than 3.5; and
    an additive masterbatch for increasing the degradation rate of the thermoplastic film,
wherein the thermoplastic film comprises about 90% to about 100% by weight of the recycled PET based resin.

11. The biaxially-oriented polyethylene terephthalate thermoplastic film of claim 10, wherein the recycled PET based resin forms a core layer of the film.

12. The_biaxially-oriented polyethylene terephthalate thermoplastic film of claim 11, further comprising one or more skin layers positioned on the core layer, the one or more skin layers comprising virgin PET based resins.

13. The biaxially-oriented polyethylene terephthalate thermoplastic film of claim 12, wherein the skin layer includes silica.

14. The biaxially-oriented polyethylene terephthalate thermoplastic film of claim 10, further comprising an acrylic coating.

15. The biaxially-oriented polyethylene terephthalate_thermoplastic film of claim 10, wherein the film is metallized.

* * * * *